United States Patent Office 2,870,191
Patented Jan. 20, 1959

2,870,191

THIOPHOSPHORIC ACID ESTERS AND PROCESS FOR THEIR MANUFACTURE

Gerhard Schrader, Wuppertal-Cronenberg, Germany, assignor to Farbenfabriken Bayer Aktiengesellschaft, Leverkusen, Germany, a corporation of Germany No Drawing. Application November 27, 1957
Serial No. 699,178

Claims priority, application Germany December 21, 1956

3 Claims. (Cl. 260—461)

The present invention relates to and has as its objects thiophosphoric acid esters of the following formula

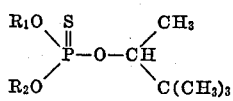

wherein $R_1$ and $R_2$ stand for alkyl radicals preferably having 1 to 4 carbon atoms.

These hitherto unknown compounds differ considerably in their insecticidal properties from comparable thionophosphoric acid esters of other secondary alcohols (isopropyl alcohol, secondary butyl alcohol, methyl propyl carbinol, cyclohexanol and the like).

The dialkylthiono-phosphoric acid esters of pinacoline alcohol according to the invention are obtainable by effecting the reaction between pinacoline alcohol and the corresponding thiophosphoric ester halide preferably in the presence of a tertiary amine as an acid-binding agent. Pyridine has proved to be a particularly suitable acid-binding agent. Instead of thiophosphoric acid chloride also phosphorous acid halides may be used for this reaction, and in the latter case the sulfur may be subsequently introduced in known manner, i. e. by adding sulfur to the reaction mixture. The reaction may be carried out in suitable inert solvents, but most advantageously an excess of the acid-binding agent (tertiary amine) is used to perform the reaction. The temperature for completing the reaction is about 0 to 100° C., but temperatures somewhat higher than room temperature say up to about 60° C. may be used preferably. The dialkyl-thionophosphoric acid esters of pinacoline alcohol are clear water-insoluble compounds which can be distilled under high vacuum.

The new compounds of the present invention very effectively kill insects like flies, mites, aphids, etc. They distinguish themselves especially by a good contact-insecticidal activity and at the same time by an activity on eating insects such as caterpillars. Most surprisingly they are of remarkable low toxicity against mammals. They may be used in the same manner as other known phosphoric insecticides, i. e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers) alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds, the compound of the following formula (1) 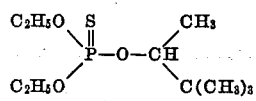

has been tested against spider mites, caterpillars and mosquito larvae. For comparison the compounds of the following formulae (2) 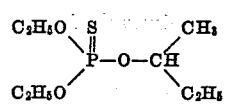

and (3) 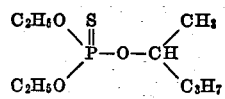

also have been tested against the same pests in the same way. Aqueous dilutions of these compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted to the desired concentration, which is to be seen from the list below.

The tests have been carried out as follows:

(A) Against spider mites, *Tetranychus altaeae*, V. Hanst (two spotted spider), on *Phaseolus vulgaris* plants which have been sprayed to the run off by the aqueous emulsions as prepared above;

(B) Against caterpillars of *Plutella cruciferarum*, Zell (diamond back moth), on young plants of white cabbage which have been sprayed with the above prepared aqueous dilutions to the run off;

(C) Against mosquito larvae: 20 to 40 larvae in the last larval instar of *Aedes Aegypti* L. (yellow fever mosquito), have been placed in the aqueous dilution prepared as indicated above.

Killing effect in each case has been determined after 24 hours. The following results have been obtained:

| (A) spider mites | | (B) caterpillars | | (C) mosquito larvae | |
|---|---|---|---|---|---|
| conc., percent | kill, percent | conc., percent | kill, percent | conc., percent | kill, percent |
| 0.1 | 100 | 0.1 | 100 | 0.0001 | 100 |

(1) 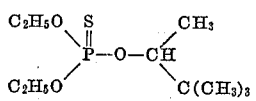

| (A) spider mites | | (B) caterpillars | | (C) mosquito larvae | |
|---|---|---|---|---|---|
| conc., percent | kill, percent | conc., percent | kill, percent | conc., percent | kill, percent |
| 0.1 | no | 0.1 | no | 0.01 | 100 |
| | | | | 0.001 | no |
| | | | | 0.0001 | no |

(2) 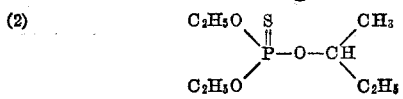

| (A) spider mites | | (B) caterpillars | | (C) mosquito larvae | |
|---|---|---|---|---|---|
| conc., percent | kill, percent | conc., percent | kill, percent | conc., percent | kill, percent |
| 0.1 | no | 0.1 | no | 0.001 | 100 |
|  |  |  |  | 0.0001 | no |

(3) 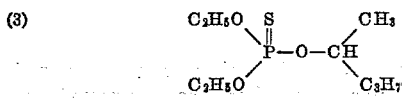

The following examples are given by way of illustration only without limiting the present invention thereto.

Example 1

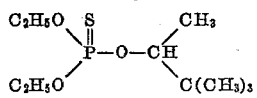

22 grams of pinacoline alcohol are mixed with 32 grams of pyridine. 38 grams of diethyl thiophosphoric acid chloride are added dropwise with stirring at 60° C. The temperature of 60° C. is maintained without further heating for about 20 minutes. Pyridine hydrochloride precipitates after a short time. The temperature is kept at 60° C. for another hour and the mixture is then diluted with 200 millilitres of ice-water to which 10 millilitres of diluted hydrochloric acid are added. The water-insoluble oil is taken up in chloroform, washed with water, dried over sodium sulfate and fractionated under high vacuum. 18 grams of the new ester are thus obtained, B. P. 61° C./0.01 mm. Hg.

Example 2

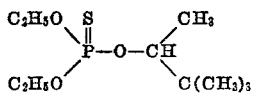

52 grams of pinacoline alcohol are dissolved in 42 millilitres of pyridine. 200 millilitres of benzene are added thereto. 80 grams of diethyl-phosphorous acid monochloride are then added dropwise with stirring at 35–40° C., pyridine hydrochloride precipitating in the course of the reaction. 16 grams of finely powdered sulfur are then added, and the mixture is heated to 60° C. for an hour. After working-up as indicated in Example 1, 40 grams of the new ester, B. P. 62° C./0.01 mm. Hg are obtained as a sparingly water-soluble clear oil.

Calculated for mol 254: S=12.6%; P=12.2%. Found: S=12.1%; P=12.19%.

The new ester shows a $LD_{50}$ of 100 mg./kg. on rats orally.

Example 3

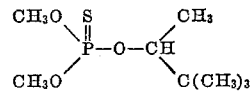

21 grams of pinacoline alcohol are dissolved in 17 grams of pyridine. 100 millilitres of benzene are added to the solution and then 26 grams of dimethyl phosphorous acid monochloride are added dropwise. Pyridine hydrochloride separates out. 6.4 grams of sulfur are then added and the mixture is heated with stirring to 50° C. for another hour. After working up as usual, 15 grams of the new ester of B. P. 40° C./0.01 mm. Hg are obtained.

Calculation for mol 226: S=14.3%; P=13.9%. Found: S=14.4%; P=14.2%.

The new ester shows an $LD_{50}$ of 1000 mg./kg. on rats orally.

By exactly the same method as described in the foregoing examples there have been prepared the corresponding propyl-, isopropyl-, tertiary butyl-, secondary butyl-, isobutyl-, and n-butyl-esters of the before shown type.

I claim:

1. Thionophosphoric acid esters of the following formula

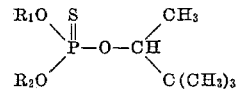

wherein $R_1$ and $R_2$ stand for alkyl radicals having 1 to 4 carbon atoms.

2. The thiophosphoric acid ester of the following formula

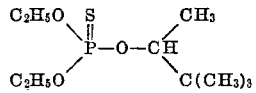

3. The thiophosphoric acid ester of the following formula

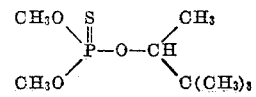

References Cited in the file of this patent

UNITED STATES PATENTS 2,802,856   Norman et al. _____ Aug. 13, 1957